E. J. DOHENY.
STOPPER EXTRACTOR.
APPLICATION FILED MAY 8, 1913.
1,091,301.
Patented Mar. 24, 1914.
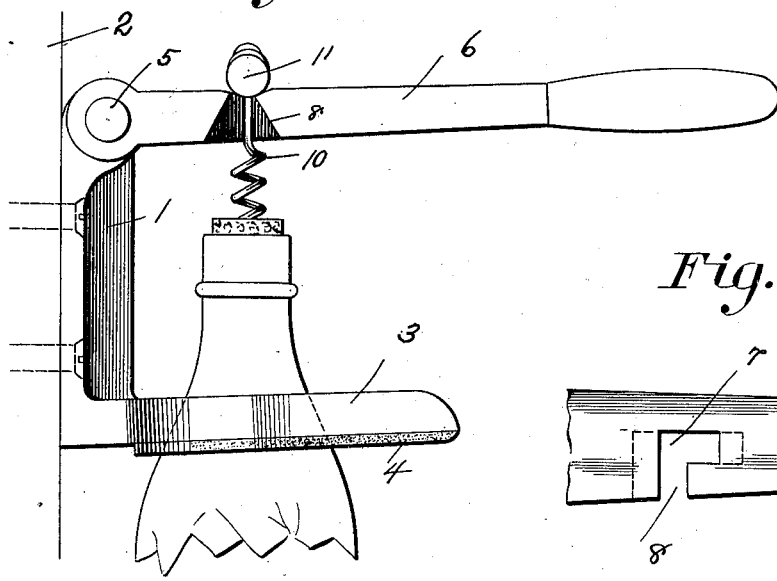
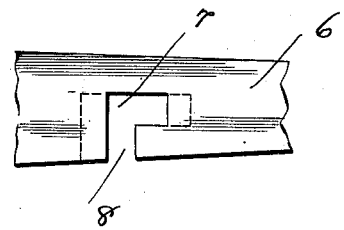
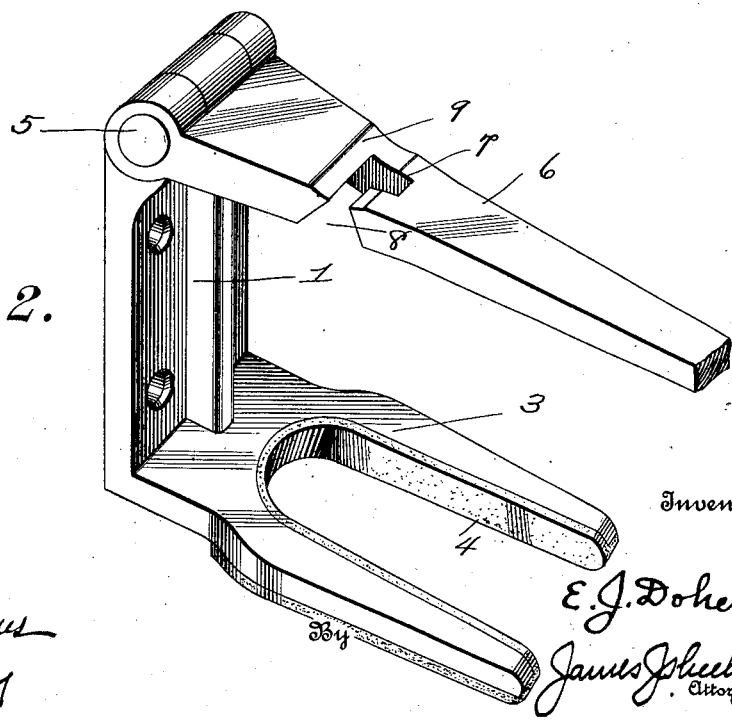
Witnesses
Philip E. Barnes
E. J. Sheeley
Inventor
E. J. Doheny
By James J. Sheehy
Attorneys

UNITED STATES PATENT OFFICE.

EDWARD J. DOHENY, OF WOONSOCKET, RHODE ISLAND.

STOPPER-EXTRACTOR.

1,091,301. Specification of Letters Patent. Patented Mar. 24, 1914.

Application filed May 8, 1913. Serial No. 766,301.

*To all whom it may concern:*

Be it known that I, EDWARD J. DOHENY, a citizen of the United States, residing at Woonsocket, in the county of Providence and State of Rhode Island, have invented new and useful Improvements in Stopper-Extractors, of which the following is a specification.

My present invention pertains to stopper extractors; and it contemplates the provision of a simple, efficient and easily operated device through the medium of which a stopper can be extracted from a bottle without agitating the bottle or its contents, this being desirable because many liquors when roiled are rendered unfit for use, and also being desirable when the liquors are rendered effervescent by agitation.

The invention in all of its details will be fully understood from the following description and claim when the same are read in connection with the drawings, accompanying and forming part of this specification, in which:

Figure 1 is a view showing in side elevation the manner in which my improved means are used. Fig. 2 is a perspective on an enlarged scale, showing the body, bottle holder and hand lever comprised in the improved means. Fig. 3 is a detail plan of a modification hereinafter specifically referred to.

Referring by numerals to the said drawings, and more particularly to Figs. 1 and 2 thereof; 1 is the body of my novel device, which is designed to be arranged against and fixedly connected to a wall 2 or any other suitable support that is available. Formed integral with and extending laterally from the body 1 is an apertured bottle holder 3. The aperture in the said body is preferably, though not necessarily, in the form of a bifurcation, as shown in Fig. 2, and is tapered or gradually reduced in width toward its inner end, the latter to enable it to receive and snugly hold the upper portions of bottles of different diameters. At its under side and inner side the said holder 3 is provided with a cushioning pad 4, which has for its purpose to lessen the liability of breakage when a bottle is placed in the holder, and also when the bottle is pulled upwardly incidental to the extracting of a stopper therefrom.

Pivoted at 5 to the upper portion of the body 1, is the hand lever 6 comprised in my novel means. The said lever is provided at an intermediate point of its length with a vertically disposed opening 7, the end walls of which are inclined downwardly and outwardly. It will also be observed that the lever 6 is provided in its edge with an opening 8, of less length than the opening 7, which opening 8 communicates with the said opening 7. In its upper side the lever 6 is provided with a transverse concavity 9 arranged above and in communication with the openings 7 and 8. The said concavity 9 is not, however, essential, and it may therefore be omitted from the lever, and the upper side of the lever left flat as shown in Fig. 3.

In combination with the holder 3 and the lever 6, I employ a stopper puller, preferably of conventional construction—*i. e.*, one having a screw shank 10 and a T-handle 11; the said shank 10, or rather the upper portion thereof, being designed to be introduced through the opening 8 and into the opening 7 of the lever 6, and the T-handle 11 being designed to be seated in the concavity 9, when such concavity is employed, after the manner shown in Fig. 1.

In the practical use of my improvement, the ordinary extractor is turned in conventional manner by hand into the stopper to be extracted. The upper portion of the bottle is then placed in the holder 3, and the stem of the hand extractor is inserted through the aperture 8 and into the aperture 7, and the handle 11 of the hand extractor is disposed in the concavity 9 of the lever 6 and at a right angle to said lever. With this done it will be manifest that when the lever 6 is swung upwardly, the stopper will be extracted from the bottle. It will also be readily understood that during the extracting operation, the bottle will be firmly held against movement and consequently the contents thereof will not be agitated.

I have entered into a detailed description of the construction and relative arrangement of parts embraced in the present and preferred embodiment of my invention, in order to impart a full, clear, and exact understanding of the said embodiment. I do not desire, however, to be understood as confining myself to the said specific construction and relative arrangement of parts as, in the future practice of the invention, I reserve the right to make such changes or modifications as fairly fall within the scope of my invention as claimed.

Having described my invention, what I claim and desire to secure by Letters-Patent, is:

A stopper extractor comprising a body, an apertured bottle holder fixed to and extending from the body, and a hand lever pivoted at one end to the body and disposed above the holder and having a vertical opening that extends between its lower and upper sides and also having an opening that extends from said vertical opening to one of its vertical sides throughout the height thereof, whereby after a bottle is placed in the holder a hand stopper-extractor that is secured in the stopper of the bottle can be arranged with its shank in the vertical opening of the hand lever and its handle disposed above said hand lever.

In testimony whereof I have hereunto set my hand in presence of two subscribing witnesses.

EDWARD J. DOHENY.

Witnesses:
EDGAR L. SPAULDING,
STEPHEN MAGOWN.

Copies of this patent may be obtained for five cents each, by addressing the "Commissioner of Patents, Washington, D. C."